May 20, 1952     J. F. McKINNEY     2,597,252
SPRING MOUNTED VEHICLE SEAT
Filed June 4, 1946
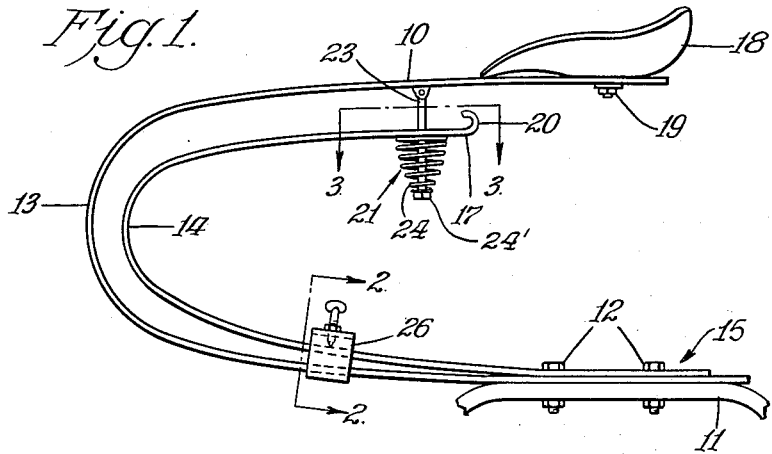
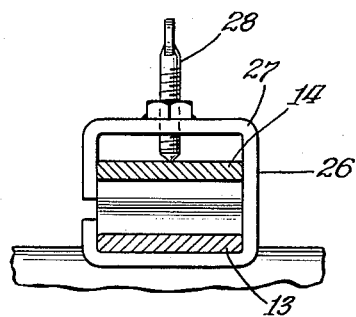
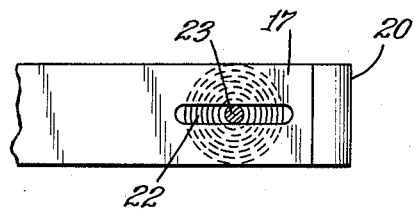
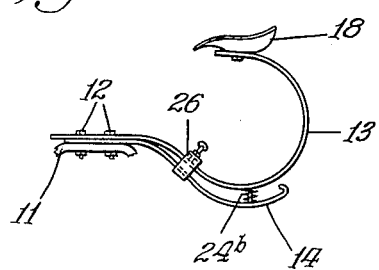
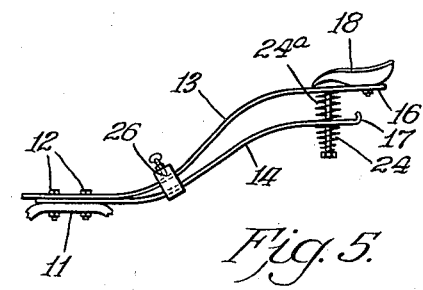
Inventor
James F. McKinney
By J. W. Leiu
Atty.

Patented May 20, 1952

2,597,252

UNITED STATES PATENT OFFICE 2,597,252

SPRING MOUNTED VEHICLE SEAT

James F. McKinney, Aurora, Ill.

Application June 4, 1946, Serial No. 674,239

4 Claims. (Cl. 155—51)

The invention relates to a vehicle seat, and more particularly to a spring seat for vehicles such as farm tractors and the like normally driven on rough and uneven terrain.

While the provision of a shock-absorbing vehicle seat of simple and inexpensive construction is advantageous generally for vehicles, it is of particular importance with respect to farm machinery such as tractors which are continuously driven over broken and ploughed ground for substantial periods of time. As the operation of such vehicles is usually maintained at the highest speed compatible with the nature of the work, severe impacts are often suffered by the operator where the vehicle is not equipped with suitable means for eliminating the severity of the jolting action. The construction of farm tractors and similar machinery is not adapted for the use of conventional shock-absorbing equipment such as is utilized in many other types of vehicles. Moreover, the severe requirements as to cost and simplicity which are normally inherent in machines such as tractors preclude the use of expensive and complicated shock-absorbing equipment. With the view to providing a shock-absorbing device meeting these considerations, the following objects more particularly refer to the vehicle seat embodying the invention.

It is among the objects of the invention to provide an improved spring vehicle seat.

It is also an object of the invention to provide a spring seat which is particularly adapted for minimizing the jolts and shocks normally encountered by a vehicle operated on rough terrain.

It is a further object of the invention to provide an inexpensive and simple spring vehicle seat which is unusually suitable for use on farm tractors and the like.

It is also an object of the invention to provide a spring seat for vehicles in which the action of the seat-supporting spring means is modified and controlled by auxiliary spring means.

A further object of the invention is the provision of a spring seat for vehicles which is adjustable for operators of varying weights.

It is also an object of the invention to provide a shifting connection between coacting spring means utilized in supporting a vehicle seat.

Further objects and advantages will be apparent from the following description and the drawings attached thereto.

In the drawing of the preferred embodiment of the invention in which like reference characters refer to like parts:

Fig. 1 is an elevational view of a spring seat construction embodying the invention;

Fig. 2 is a view taken on line 2—2 of Fig. 1;

Fig. 3 is a view taken on line 3—3 of Fig. 1;

Fig. 4 is an elevational view of a modified form of the invention; and

Fig. 5 is an elevational view of a further modification of the invention.

As illustrated in Fig. 1, spring seat 10 is secured to a vehicle support 11 by suitable means such as bolts 12. The spring seat 10 includes a main strap spring 13 and an auxiliary strap spring 14, the strap springs 13 and 14 being secured together at a base connection 15 as by bolts 12 which attach the spring seat 10 to the vehicle. The strap springs 13 and 14 are curved to afford the maximum resiliency consistent with the construction and intended use of the vehicle. The strap springs 13 and 14 extend upwardly from the vehicle to provide a free end portion 16 of the main strap spring and a free end portion 17 of the auxiliary strap spring. The free end portions 16 and 17 are adapted to flex under the pressure resulting from the resistance of the weight of the operator to the jolting of the machine. The extreme end of portion 17 is preferably bent into the form of roll 20 for increased strength. As the main strap spring 13 is designed to provide the primary support under normal operating conditions, seat 18 is secured to the free end portion 16 by suitable means such as bolt 19.

The end portion 17 of the auxiliary strap spring is connected to the end portion 16 of the main strap spring by connecting means 21 which enables the flexing action of the strap springs to be at least partially controlled by each other. In this way, movement of end portion 16 upwardly or downwardly is in coaction with the similar movement of end portion 17, thereby providing a "floating" ride for the operator. By restricting the flexing action of main spring 13 so that the vibrations of both strap springs are out of phase, the jolts resulting from the movement of the vehicle over rough terrain are absorbed to a substantial extent. Connecting means 21 is preferably of a resilient construction such as that provided by coil spring 22 and coil spring pin 23. As shown in Fig. 1, the coil spring 22 may be positioned below the free end portion 17 of the auxiliary strap spring. The coil spring pin 23 is secured in any suitable manner to the end portion 17 and to the lower end of the coil spring 22.

In the preferred embodiment of the invention as shown in Fig. 1, the main strap spring 13 is generally U shaped so as to provide an optimum flexing action by the extension of end portion 16 horizontally from the point of maximum curvature. Auxiliary strap spring 14 is preferably shaped in a similar manner to that of the main strap spring. To enable the free end portions of the strap spring to have a maximum distance for flexing, the distance between the strap springs may gradually increase from the base connection 15 to the point of connection by means 21.

The "floating action" of the spring seat is facilitated by a construction which enables the end portions 16 and 17 to shift lengthwise with respect to each other despite the use of connecting means 21. In the embodiment illustrated in Fig. 1, the relative movement of the strap springs is provided by the inclusion of slot 22 in the end portion of the auxiliary strap spring 14. The slot 22 extends lengthwise of the strap spring and is of sufficient width to accommodate coil spring pin 23. As the flexing action of end portions 16 and 17 takes place, coil spring pin 23 moves within the slot without restricting the lengthwise shifting of the strap springs, as coil spring 24 disposed about the pin 23 between a stop 24' and the underside of end portion 17 constantly urges the end portions 16 and 17 in the direction toward each other.

The construction of the main strap spring 13 and auxiliary strap spring 14 connected by means 21 permits the use of clamping means 26 for adjusting the spring seat 10 to various weights carried on the seat 18. Clamping means 26 is provided around the main strap spring and the auxiliary strap spring, preferably adjacent to the base connection 15. In compensating for varying weights of the operator, the clamp is moved lengthwise along the strap springs and then tightened so as to place the springs under tension at the desired point, the clamp being moved away from the base connection for a heavy operator and toward the base connection for a light operator. Indicia may be provided on one or both of the strap springs to facilitate accurate positioning of the clamp. As shown in the drawing, the clamping means 26 comprises a sleeve 27 having a thumb screw 28 threaded in the top of the sleeve so as to bear against the auxiliary strap spring 14. As the thumb screw 28 is forced inwardly, the strap springs are placed under tension and become more closely associated thereby to stiffen the adjacent strap sections to reduce the amount of possible flexing action.

In the modified form of the invention shown in Fig. 5, the shape of the main strap spring 13 and auxiliary strap spring 14 enables the seat 18 to be positioned to the rear of vehicle support 11. The flexing action of this construction is provided by the up and down movement of end portions 16 and 17 as they extend rearwardly from the point of maximum curvature of the strap springs. This embodiment illustrates the use of two coil springs, one of which is the same and arranged as the coil spring 24 previously described and the other 24ᵃ is disposed about the pin 23 in the region between the end portions 16 and 17, for resiliently connecting the end portions of the strap springs, that is, one coil spring being positioned between the end portions 16 and 17 and the other coil spring being utilized below end portion 17. Clamping means 26 may be utilized with the strap springs to compensate for the varying weights of the rider.

A further modification of the invention is shown in Fig. 4 in which the strap springs extend rearwardly from vehicle support 11. Main spring 13 is circular for a portion of its length with the auxiliary strap spring being positioned below the circular portion of the main strap spring. In this embodiment, a single coil spring 24ᵇ may be used intermediate the strap springs 13 and 14. The adjustment of the spring seat for varying weights may be made by proper positioning of clamping means 26.

The vehicle seat thus provided by the invention affords a floating ride by the utilization of at least two curved strap springs in which the flexing of either spring is modified by the similar action of the other. By placing the vibrations of the strap springs at least partially out of phase, the shocks incident to the operation of a vehicle such as a farm tractor over rough terrain are absorbed to an unusual extent. This simple and inexpensive construction is particularly adapted for the replacement of conventional vehicle seats or for original installation. The feature of convenient adjustment for varying weights of the operator further improves the shock-absorbing effect.

The detailed description has been given for purposes of illustration and the invention is to be limited only by the scope of the appended claims.

I claim:

1. A vehicle seat which comprises a curved main strap spring having one end secured to the vehicle and a free seat-supporting end portion, a curved auxiliary strap spring rigidly connected to the main strap spring and having a free end portion substantially below said seat-supporting end portion, means for resiliently connecting the free end portions of the main strap spring and the auxiliary strap spring, and clamping means for placing said strap springs under tension between said rigid connection and said resilient connection.

2. A vehicle seat support which comprises a curvilinear spring metal strap having one end secured to the vehicle and a free seat supporting end portion, another curvilinear spring metal strap secured to the first strap at one end and having a free end portion arranged in spaced relation below the seat supporting end portion of the first strap, means resiliently connecting the free end portions of the first and second straps, and other means intermediate the ends of the strap for adjusting the spaced relation between the end portions of said straps.

3. A vehicle seat support, as claimed in claim 2, in which the adjusting means comprises a bracket rigid with one strap having an adjustable member adapted operatively to engage the other strap.

4. A vehicle seat as claimed in claim 3 in which the curved portions of said main and second auxiliary strap springs are curved forwardly and then back upon themselves so that the seat supporting end portion is located above in substantially vertically spaced alignment with the portion at which the strap springs are secured to the vehicle.

JAMES F. McKINNEY.

REFERENCES CITED

The following references are of record in the file of this patent:

UNITED STATES PATENTS

| Number | Name | Date |
|---|---|---|
| 78,531 | Ludlow | June 2, 1868 |
| 420,483 | White | Feb. 4, 1890 |
| 736,665 | Wilson | Aug. 18, 1903 |
| 849,109 | Emmerich | Apr. 2, 1907 |
| 957,411 | Christensen | May 10, 1910 |
| 1,193,977 | Bereth | Aug. 8, 1916 |
| 1,433,720 | Hendrickson | Oct. 31, 1922 |
| 1,663,112 | Caslow | Mar. 20, 1928 |

FOREIGN PATENTS

| Number | Country | Date |
|---|---|---|
| 768,496 | France | of 1934 |